United States Patent [19]

Cann

[11] Patent Number: 4,878,454

[45] Date of Patent: Nov. 7, 1989

[54] ELECTROSTATIC PAINTING APPARATUS HAVING OPTICALLY SENSED FLOW METER

[75] Inventor: Roger S. Cann, Mt. Clemens, Mich.

[73] Assignee: Behr Industrial Equipment Inc., Rochester, Mich.

[21] Appl. No.: 245,683

[22] Filed: Sep. 16, 1988

[51] Int. Cl.⁴ ............................................. B05C 11/00
[52] U.S. Cl. ................................... 118/663; 118/629; 73/261; 73/861.77; 73/861.94; 324/175; 239/68; 239/112; 239/703; 239/708
[58] Field of Search ............... 73/261, 861.77, 861.94; 324/175; 118/629, 663; 239/708, 68, 112, 113, 703

[56] References Cited

U.S. PATENT DOCUMENTS

| 3,342,071 | 9/1967 | Meyers | 73/261 |
|---|---|---|---|
| 4,159,806 | 7/1979 | Scharfenberger | 239/708 |
| 4,539,932 | 9/1985 | Vecellio | 118/629 |
| 4,723,726 | 2/1988 | Oishi et al. | 324/175 |
| 4,767,164 | 8/1988 | Yeung | 324/175 |
| 4,789,100 | 12/1988 | Senf | 239/68 |

FOREIGN PATENT DOCUMENTS

| 2630149 | 1/1977 | Fed. Rep. of Germany | 73/861.79 |
|---|---|---|---|
| 94221 | 7/1981 | Japan | 73/861.77 |

Primary Examiner—Bernard Nozick
Attorney, Agent, or Firm—Reising, Ethington, Barnard, Perry & Milton

[57] ABSTRACT

A high-voltage electrostatic painting apparatus (10) for coating an article (12) inside a spray booth (14). The apparatus (10) includes a flow rate meter (34) disposed within the electrostatic environment for measuring the rate at which paint is supplied to a discharge atomizer (18). The meter (34) includes two intermeshing rotors (44, 46) disposed within a sealed non-ferromagnetic housing (54). The two rotors (44, 46) rotate in response to liquid paint flowing through the housing (54). A magnetic coupling (64) acts through the housing (54) to drive an optical signal producing disc (62). A pick-up sensor (82) senses the optical signal from the disc (62) and sends that signal outside the booth (14) to a master control unit (40) via a fiber optic conductor (90). The master control unit (40) automatically adjusts a flow rate regulator valve (92) to provide a constant rate of paint flow to the discharge atomizer (18).

23 Claims, 2 Drawing Sheets

ELECTROSTATIC PAINTING APPARATUS HAVING OPTICALLY SENSED FLOW METER

TECHNICAL FIELD

The subject invention relates to an electrostatic painting apparatus including a flow rate meter for measuring the rate of paint flow to a discharge atomizer. More specifically, the invention provides an optical sensing means associated with the flow rate meter for sending an optical signal to a remote master control unit to automatically regulate the paint flow rate.

BACKGROUND ART

In the electrostatic painting of articles, for example automobile bodies, it is necessary to establish an electrical potential between a discharge atomizer and the automobile body so that the atomized paint particles become electrostatically charged for attraction to the electrically grounded automobile body. Establishing such an electrical potential typically requires an extremely high voltage source, typically in the order of 100 KV. This high voltage source creates, as a by-product, an electrical field within a limited area about the discharge atomizer which tends to adversely effect all electronic instruments within the vicinity.

Paint, solvents, and the like, are typically supplied to the discharge atomizer using compressed air as the motive source. In most assembly line type automobile body painting facilities, the compressed air supply pressure will fluxuate a great deal. Thus, the rate of paint flow to the discharge atomizer will vary in response to the fluctuating air pressure unless a regulator valve is provided for regulating the flow rate of paint to the discharge atomizer. A constant dependable flow rate to the discharge atomizer, therefore, must be provided in order to ensure an evenly applied coat of paint to the automobile body.

To this end, flow meters are typically provided in a painting apparatus for measuring the flow rate to the discharge atomizer so that the regulator valve may be automatically readjusted to stabilize the flow rate to the discharge atomizer. Because of the electrical field created by the high voltage source, however, it has heretofore been difficult to achieve accurate readings of the measured flow rate from the meter since electronic recording data, when used in the vicinity of the electrical field, is adversely affected so as to yield unreliable results.

There is being marketed an optical sensing flow rate meter for optically measuring the rate of paint flow. However, this device is deficient in that a means for creating the light, e.g., a light bulb, is located within the housing of the flow meter. This means for creating light includes a supply of electricity, which, because the meter is located within the electrical field, is adversely affected by the electrical field resulting in inaccurate operation.

SUMMARY OF THE INVENTION AND ADVANTAGES

A high-voltage electrostatic painting apparatus of the type for coating an article with any one of several colors of paint is provided. The apparatus comprises a spray booth, discharge means for discharging paint onto articles in the booth, fluid flow means for conducting liquid paint from outside the booth to the discharge means, meter means in the booth for measuring the rate of flow of the paint through the fluid flow means, electrostatic charging means creating an electrical field in the booth for establishing an electrical potential between the discharge means and the article to be painted, and master control means outside the booth for controlling the painting of articles in the booth. The apparatus is characterized by including optical sensing means responsive to the flow rate measurements of the meter means for sending an optical signal from the meter means to the master control means whereby the electrical field created by the electrostatic charging means in the booth will not adversely effect a reading of the paint flow rate measurement at the master control means.

The subject invention overcomes the deficiencies in the prior art by providing optical sensing means which is substantially impervious, or immune, to the effects of the electrical field in the booth. The optical sensing means merely reads the flow rate measurement of the meter means and then sends those readings, in the form of optical signals, outside of the booth and the reaches of the electrical field to electronic equipment in the master control means which accurately read the measurements of the meter means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view of the meter means according to the subject invention showing the internally housed rotors.

DETAILED DESCRIPTION OF THE PREFERRED EMBODIMENT

Figure 1:
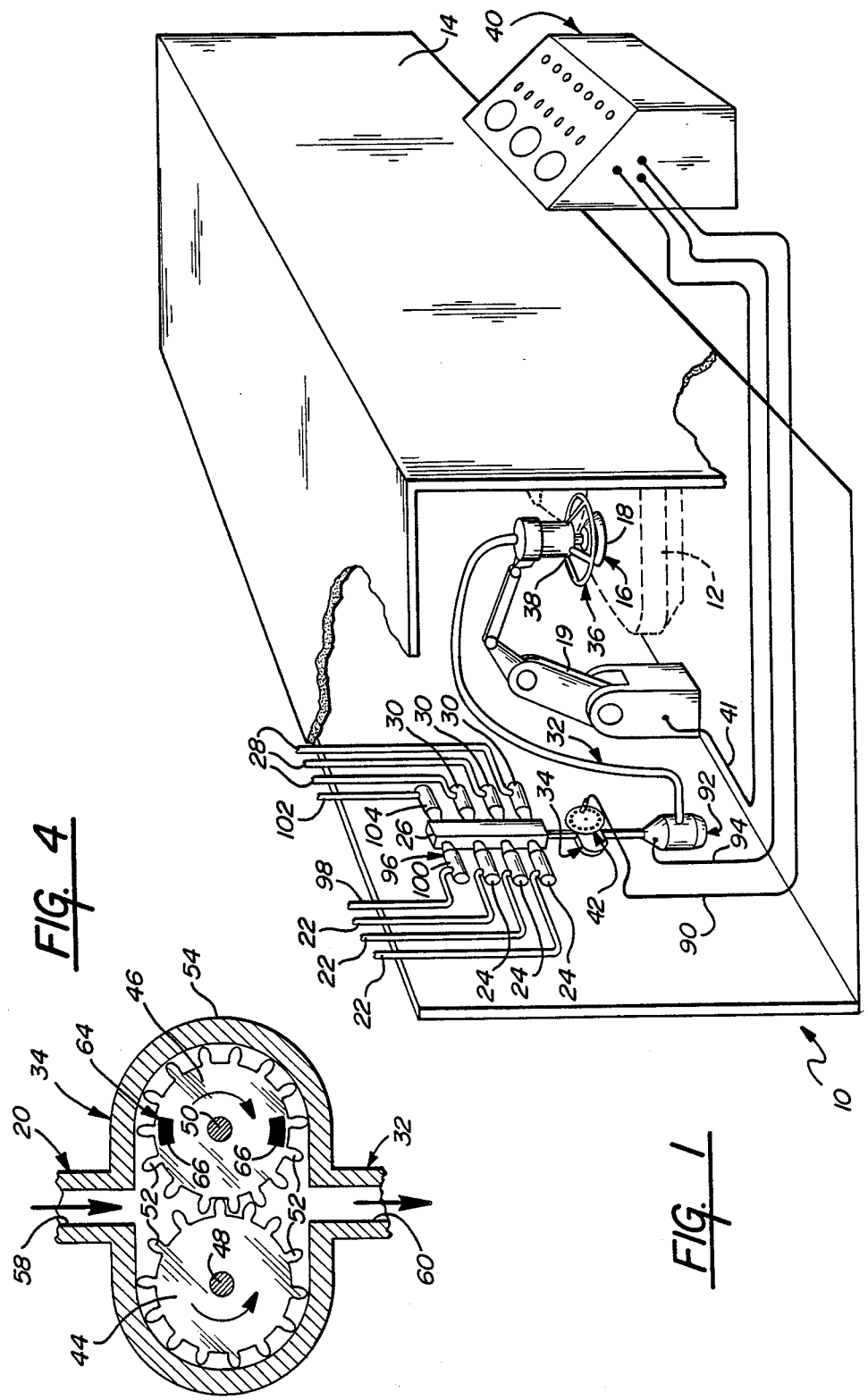
FIG. 1 is an environmental view of the subject painting apparatus.

Referring to FIG. 1, a high-voltage electrostatic painting apparatus is generally shown at 10. The apparatus 10 is of the type for coating an article 12, shown in phantom as an automobile body, with any one of several colors of paint primer, or other coatings. As will become apparent, the subject painting apparatus 10 is particularly adapted for implementation in an assembly line operation. Because each automobile body 12 will most likely be coated with a different color than the preceding automobile body 12, the painting apparatus 10, is capable of coating articles with any one of several different color choices. In addition, as will be described in greater detail subsequently, the painting apparatus 10 must be flushed out with solvent in order to remove the remains of a previously applied paint color before a different color is introduced.

A simplified view of a spray booth 14 is shown in FIG. 1. The spray booth 14 typically includes some form of conveying means (not shown) for conveying articles 12 to be painted through the booth 14. The booth 14 performs several functions, the most important of which is to prevent wind borne dust and other particulate from contacting the freshly painted surface of the automobile body 12.

A discharge means, generally indicated at 16 in FIG. 1, is provided for discharging paint in atomized form onto articles 12 in the spray booth 14. Preferably, the discharge means 16 includes a discharge atomizer 18 which may take the form of a rotary bell atomizer as illustrated in FIG. 1. Such rotary bell atomizers 18 are commonly powered by compressed air directed through a turbine type motor. The discharge means 16 is shown supported upon a robotic arm 19 which is computer controlled to move the discharge atomizer 18 along a predetermined path corresponding to the contours of the automobile body 12.

A fluid flow means, generally indicated at 20 in FIG. 1, is provided for conducting liquid paint from outside the spray booth 14 to the discharge means 16. More particularly, the fluid flow means 20 comprises a network of flexible conduits. In FIG. 1, three conduits 22 are shown each extending from a separate supply of paint to a respective injector valve 24. The three injector valves 24 communicate with a color changer 26 located inside the booth 14. Three compressed air lines 28, corresponding with the three paint supply conduits 22, similarly include a valve 30 opposing each of the injector valves 24. A feed conduit, generally indicated at 32 in FIG. 1, extends from the color changer 26 to the discharge means 16. During coating of an article 12, paint is injected from one of the conduits 22, through its associated injector valve 24, into the color changer 26. This injected paint then travels through the feed conduit 32 and finally reaches the discharge atomizer 18 where it is atomized and charged for electrostatic deposit onto the automobile body 12. The compressed air from the lines 28 supply the energy to move the paint from the color changer 26 to the discharge atomizer 18. Left unregulated, therefore, the rate of paint flow through the feed conduit 32 would be solely dependant upon the pressure of the compressed air supplied, which typically fluctuates in a large plant.

A meter means, generally indicated at 34 in FIGS. 1-4, is located in the booth 14 for measuring the rate of flow of the paint through the fluid flow means 20. The meter means 34, more particularly, is in communication with the feed conduit 32, as shown in FIG. 1, and thus measures the flow rate of paint from the color changer 26 to the discharge atomizer 18.

An electrostatic charging means, generally indicated at 36 in FIG. 1, is provided for establishing an electrical potential between the discharge means 16 and the article 12 to be painted. As a byproduct of this, the electrostatic charging means 36 also creates an electrical field within the booth 14. Because of the extremely high voltage supplied to the electrostatic charging means 36 to establish the required electrical potential, typically in the order of 100 KV, the electrical field within the booth 14 is of a very high magnitude and hence harmful to all sensitive electronic equipment in the vicinity. As shown in FIG. 1, the electrostatic charging means 36 may take the form of a continuous annular charging ring 38 disposed about and set behind from the discharge atomizer 18. The charging ring 38 is, of course, but one type of electrostatic charging means 36 which may be used to establish the desired electrical potential. It should be here noted that the harmful electrical field created by the 100 KV voltage supply to the charging ring 38 is substantially contained within the spray booth 14 so that sensitive electronic equipment outside the spray booth 14 are not affected.

A master control means, generally indicated at 40 in FIG. 1, is provided outside of the booth 14 for controlling the painting of articles 12 in the booth 14. The master control means 40 is equipped with one or more computers for precisely activating the required paint color changes via the injector valves 24,30 of the color changer 26, as well as any robotic movements to the robotic arm 19 via a transmission cable 41. The master control means 40 also controls the flow rate of paint through the feed conduit 32 as will be described subsequently. The master control means 40 is provided with many sensitive electronic devices which require a location outside of the spray booth 14 to insure immunity from the electrical field created by the electrostatic charging means 36.

Figure 2:
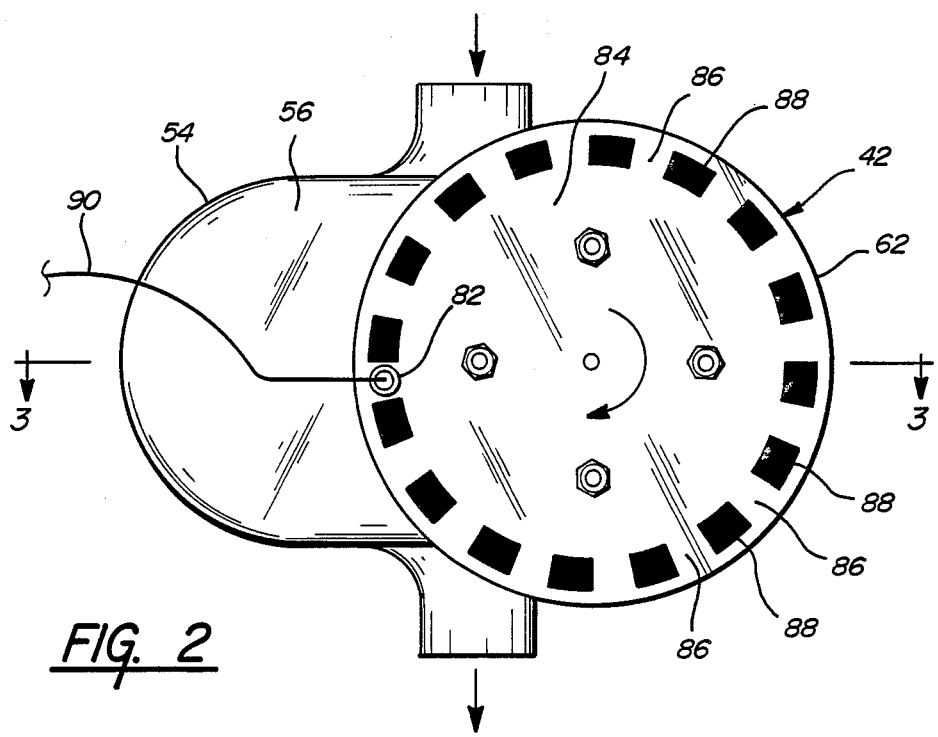
FIG. 2 is a front view of the meter means and optical sensing means according to the subject invention.
Figure 3:
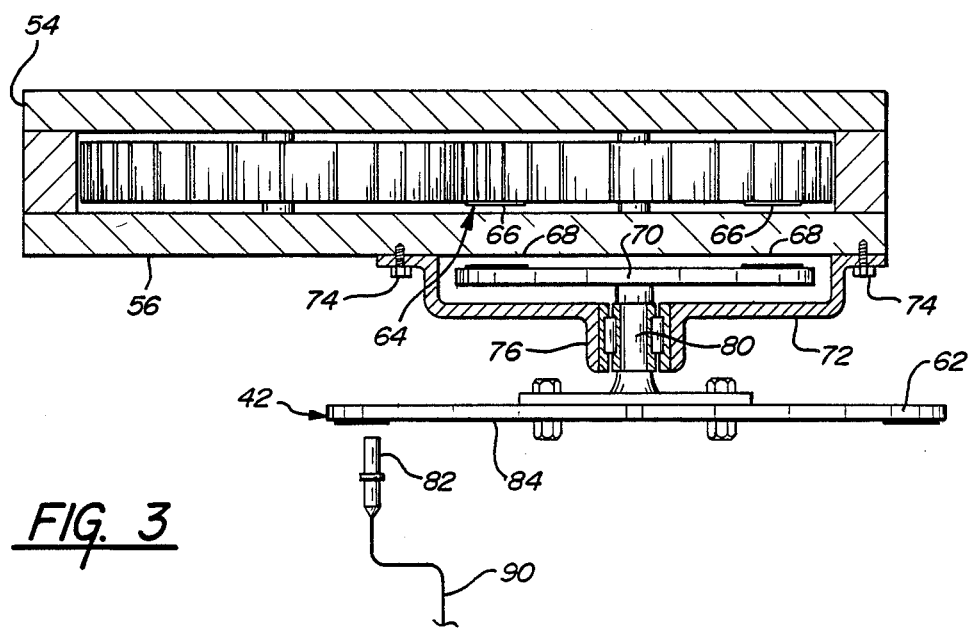
FIG. 3 is a cross-sectional view of the meter means and optical sensing means as taken along lines 3—3 of FIG. 2.

The subject invention is characterized by including optical sensing means, generally indicated at 42 in FIG. 1-3, which is responsive to the flow rate measurements of the meter means 34. The optical sensing means 42 reads an optical signal from the meter means 34 and then sends that optical signal to the master control means 40 so that flow rate adjustments may be made. The optical signal, being itself practically immune to the electrical field, is transmitted outside the range of the electrical field created by the electrostatic charging means 36 so that the master control means 40 will not be adversely effected. The optical sensing means 42, in other words, merely sends an optical signal, which is substantially unaffected by the electrostatic field from a 100 KV source, to the master control means 40 which is located outside of the range of the electrical field. In this manner, sensitive electronic devices or electrical currents of any kink are not located at the meter means 34 inside of the electrical field whereby deleterious effects would be created to yield erroneous flow rate readings.

As best shown in FIG. 4, the meter means 34 is of the positive displacement volumetric type including two intermeshing rotors 44, 46 which have an angular velocity responsive to the flow of paint through the feed conduit 32 of the fluid flow means 20. More particularly, the rotors 44, 46 are supported upon parallel axes 48, 50, respectively. The axes 48, 50 extend perpendicularly to the direction of paint flow through the feed conduit 32. Each rotor 44, 46 presents a series of equally spaced radially extending teeth 52 which respond to the paint fluid pressure, in some ways similar to a paddle wheel. That is, the fluid flow of paint urges the rotors 44,46 to rotate at a speed proportional to the flow rate. A non-ferromagnetic fluid impervious housing 54 surrounds the rotors 44, 46 and presents an exposed exterior surface 56, as shown in FIGS. 1 and 3. The interior of the housing 54 is oval-shaped having ends corresponding in diameter to the radial extent of the rotor teeth 52. That is, the rotor teeth 52 of each of the rotors 44, 46 are held in a closely spaced relationship to the interior of the housing 54 to prevent leakage of fluid therepast. The housing 54 includes an inlet opening 58 and an exit opening 60. The inlet 58 receives paint from the color changer 26 while the outlet 60 directs the paint to the discharge atomizer 18.

Paint flow entering the housing 54 from the inlet 58 moves around the outside of the rotors 44, 46 and toward the outlet 60 to induce rotation in each of the rotors 44, 46 in the direction of the arrows shown in FIG. 4. As mentioned above, the greater the flow rate of fluid through the meter means 34, the greater the angular velocity the rotors 44, 46. In other words, the rotational speed of the rotors 44, 46 is directly proportional to the flow rate of paint through the fluid flow means 20. Therefore, it is necessary to ascertain the rotational speed of at least one of the rotors 44, 46 in order to determine the flow rate of paint through the meter means 34.

The optical sensing means 42 includes a rotating disc 62, best shown in FIG. 2, which is adjacent the exterior surface 56 of the housing 54 for rotating in response to the rotation of one of the rotors 46 and producing the optical signal to be sent to the master control means 40. That is, the disc 62 modifies light in a manner that an optical light signal may be sensed, the frequency of which indicates the flow rate of paint through the meter means 34. The rotating disc 62 rotates with the one rotor 46 and is disposed in an accessible location so that the rate of rotation of the rotator 46 can be read using an optical signal reflected from the rotating disc 62, as will be discussed in greater detail subsequently.

The disc 62 of the optical sensing means 42 includes magnetic coupling means, generally indicated at 64 in FIG. 3, for magnetically coupling through the housing 54 to the rotor 46. The magnetic coupling means 64 causes the disc 62 to rotate with the rotor 46 without requiring any mechanical connection through the housing 54. In this manner, the fluid impervious characteristics of the housing 54 are provided without requiring the added cost and complexity of fluid seals and additional parts which could wear out. It will be appreciated that because the magnetic coupling means 64 acts through the housing 54, the housing 54 can not be fabricated from a ferromagentic material lest it would interfere with the coupling properties.

As shown in FIGS. 3 and 4, the magnetic coupling means 64 includes at least one driver magnet 66 mounted on the rotor 46 and at least one corresponding follower magnet 68 mounted on a driven wheel 70. The driven wheel 70 is closely spaced from the exterior surface 56 of the housing 54 and supported on an axis which is aligned with the axis 50 of the rotor 46. The driven wheel 70 is thus spaced as closely as possible to the rotor 46 in order that the driver magnets 66 and the follower magnets 68 are close together to increase the strength of the coupling properties.

As best shown in FIG. 3, the driven wheel 70 is encased within a thin-walled cover 72 fastened to the exterior surface 56 of the housing 54 with bolts 74. The cover 72 is provided with a boss 76 which supports a roller bearing 78. The roller bearing 78 rotatably supports a shaft 80 extending axially between the driven wheel 70 and the disc 62. In this manner, the disc 62, driven wheel 70 and the rotor 46 are all coaxially aligned and rotate about a common axis. Therefore, the disc 62 and the rotor 46 rotate at the same angular velocity, i.e., on a one-to-one ratio.

As shown in FIGS. 1-3, the optical sensing means 42 includes a stationary pick-up sensor 82 located adjacent the periphery the disc 62 for sensing the light produced by the disc 62. More particularly, an outer surface 84 of the disc 62 is provided with an array of equally spaced light producing or reflecting areas 86 disposed circumferentially about the perimeter. The light producing areas 86 include light reflective segments 86 separated by nonreflective or less reflective segments 88. Preferably, the reflective segments 86 and nonreflective segments 88 are of the same arcuate width and equally spaced about the circumference of the outer surface 84 adjacent the outer most edge. However, depending upon the specific characteristics of the apparatus 10, rheological properties of the paint, etc., departure from equivalent arcuate width segments 86, 88 may become necessary. Alternatively, the disc 62 may have radial slots, which merely allow light to shine through to define the non-reflective segments 88.

Thus, as the disc 62 rotates with the rotor 46, ligth is reflected by the reflective segments 86 to the pick-up sensor 82 as each reflective segment 86 crosses the scanning path. Preferably, light is created at the master control means 40 from a light source and sent via a fiber optic conductor 90 to the pick-up sensor 82 for emission toward the disc 62. The fiber optic conductor 90 is composed of at least two fiber optic cables, one cable for sending light to the pick-up sensor 82 from the master control means 40 and the other cable for sending light to the master control means 40 from the pick-up sensor 82. Each time a light signal is reflected to the pick-up sensor 82, therefore, an optical signal is sent via the fiber optic conductor 90 to the master control means 40. The master control means 40 analyzes the frequency at which the optical signals arrive and computes an instantaneous flow rate for the paint.

It is desirable to monitor the rate of paint flow through the feed conduit 32 for the purpose of regulating a constant flow rate of paint to the discharge atomizer 18. To this end, the fluid flow means 20 includes a regulator means 92 for regulating the flow rate of paint to the discharge means 16. A regulator means, generally indicated at 92 in FIG. 1, comprises a regulator valve disposed on the feed conduit 32 between the meter means 34 and the discharge means 16. A feedback means 94 is provided for sending a signal from the master control means 40 to the regulator means 92 in response to the optical signal transmitted from the optical sensing means 42 to automatically adjust the flow rate through the fluid flow means 20. The master control means 40, upon receiving the optical signals from the optical sensing means 42 and automatically computing the paint flow rate from the frequency of the optical signals, sends a signal via the feedback means 94 to the regulator means 92 to automatically adjust the flow rate of fluid through the feed conduit 32 and deliver a uniform flow rate of paint to the discharge atomizer 18. In this manner, a controlled discharge rate and quantity of paint is achieved for evenly coating each automobile body 12.

Because different colors of paint are applied to different automobile bodies 12, is necessary that the fluid means 20 be thoroughly flushed, i.e., cleansed, before a paint of a different color than last supplied is introduced into the system. For this reason, the color changer 26 includes flushing means, generally indicated at 96 in FIG. 1, for flushing paint from the color changer 26, the meter means 34, the feed conduit 32 and the discharge means 16 prior to introducing a different color into the system. The flushing means 96 includes a supply of solvent introduced via a conduit 98 and a valve 100 at the color changer 26. A supply of compressed air via a conduit 102 is introduced into the color changer 26 through an opposing valve 104 to move the solvent through the lines. In this manner, the fluid flow means 20 is completely flushed after each automobile body 12 is painted in ensure contaminant free painting.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A high-voltage electrostatic painting apparatus (10) of the type for coating an article (12) with any one of several colors of paint, said apparatus (10) comprising:

a spray booth (14);

discharge means (16) for discharging paint onto articles (12) on said booth (14);

fluid flow means (20) for conducting liquid paint from outside said booth (14) to said discharge means (16);

meter means (34) in said booth (14) for measuring the rate of flow of the paint through said fluid flow means (34);

electrostatic charging means (36) creating an electrical field within said booth (14) for establishing an electrical potential between said discharge means (16) and the article (12) to be painted;

master control means (40) outside said booth (14) for controlling the flow of liquid paint to the discharge means (16) thereby controlling the painting of articles (12) in said booth (14);

and characterized by including optical sensing means (42) responsive to the flow rate measurements of said meter means (34) for sending an optical signal from said meter means (34) to said master control means (40) for controlling the flow of liquid paint whereby the electrical field created by said electrostatic charging means (36) in said booth (14) will not adversely affect a reading of the paint flow rate measurement at said master control means (40).

2. An apparatus (10) as set for in claim 1 further characterized by said meter means (34) including two inter meshing rotors (44,46) having an angular velocity responsive to the flow of paint through said fluid flow means (20) whereby the rotation of said rotors (44, 46) indicates the volume of fluid flow therethrough, said rotors (44,46) supported for rotation upon parallel axes (48,50) extending perpendicularly to the direction of paint flow through said fluid flow means (20).

3. An apparatus (10) as set forth in claim 2 further characterized by said meter means (34) including a fluid impervious non-ferromagnetic housing (54) surrounding said rotors (44,46) and having an exterior surface (56).

4. An apparatus (10) as set forth in claim 3 further characterized by said optical sensing means (42) including a rotating disc (62) adjacent said exterior surface (56) of said housing (54) for rotating at an angular velocity proportional to the angular velocity of one of said rotors (46) and producing the optical signal to be sent to said master control means (40).

5. An apparatus (10) as set forth in claim 4 further characterized by said disc (62) of said optical sensing means (42) including magnetic coupling means (64) for magnetically coupling said one rotor (46) to said disc (62) through said housing (54) to rotate said disc (62) with said one rotor (46).

6. An apparatus (10) as set forth in claim 5 further characterized by said disc (62) including an array of equally spaced light producing areas (86) disposed circumferentially about an outer surface (84) of said disc (62).

7. An apparatus (10) as set forth in claim 6 further characterized by said light producing areas (86) of said disc (62) including light reflective segments (86) separated by non-reflective segments (88) having a lower light reflectivity than said reflective segments (86).

8. An apparatus (10) as set forth in claim 7 further characterized by said magnetic coupling means (64) including at least one driver magnet (66) mounted on said one rotor (46) and at least one corresponding follower magnet (68) mounted on a driven wheel (70) closely spaced from said housing (54) and supported for rotation about an axis coincidental with said axis (50) of said one rotor (46).

9. An apparatus (10) as set forth in claim 8 further characterized by said disc (62) and said driven wheel (70) being rotated about a common axis.

10. An apparatus (10) as set forth in claim 9 further characterized by said optical sensing means (42) including a stationary pick-up sensor (82) adjacent said disc (62) for sensing light produced by said disc (62).

11. An apparatus (10) as set forth in claim 10 further characterized by said optical sensing means (42) including a fiber optic conductor (90) for transmitting light sensed at said pick-up sensor (82) to said master control means (40).

12. An apparatus (10) as set forth in claim 11 further characterized by said master control means (40) including a light source transmitting light through a fiber optic cable in said conductor (90) to said pick-up sensor (82) for emitting light onto said disc (62).

13. An apparatus (10) as set forth in claim 12 further characterized by said fluid flow means (20) including regulator means (92) for regulating the flow rate to said discharge means (16).

14. An apparatus (10) as set forth in claim 13 further characterized by including feed back means (94) for sending a signal from said master control means (40) to said regulator means (92) in response to the optical signal from said optical sensing means (42) to automatically adjust the flow rate through said fluid flow means (20).

15. An apparatus (10) as set forth in claim 14 further characterized by said regulator means (92) being disposed between said meter means (34) and said discharge means (16).

16. An apparatus (10) as set forth in claim 15 further characterized by said fluid flow means (20) including a feed conduit (32) in said booth in communication with said meter means (34) and said discharge means (16), and a color changer (26) for injecting any one of a plurality of paint colors into said feed conduit (32).

17. An apparatus (10) as set forth in claim 16 further characterized by said color changer (26) including flushing means (96) for flushing paint from said feed conduit (32), said meter means (34) and said discharge means (16).

18. A volumetric flow rate meter apparatus (34) of the type for measuring the flow rate of a liquid through a conduit (32), said meter (34) comprising: a fluid impervious non-ferromagnetic housing (54) presenting an exterior surface (56); two inter meshing rotors (44,46) encased within said housing (54) and having an angular velocity responsive to the rate of fluid flow through the conduit (32), said rotors supported for rotation upon parallel axes (48,50) extending perpendicularly to the direction of flow through the conduit (34); a rotating disc (62) adjacent said exterior surface (56) of said housing (54) for rotating at an angular velocity in response to the angular velocity of one of said rotors (46) and producing an optical light signal; a stationary pick-up sensor (82) adjacent said disc (62) for optically sensing the light produced by said disc (62); and characterized by including magnetic coupling means (64) for magnetically coupling said one rotor (46) to said disc (62) through said housing (54).

19. An apparatus (34) as set forth in claim 18 further characterized by said disc (62) including an array of equally spaced light producing areas (86) disposed circumferentially about an outer surface (84) of said disc (62).

20. An apparatus (34) as set forth in claim 19 further characterized by said light producing areas (86) of said disc (62) including light reflective segments (86) separated by non-reflective segments (88) having a lower light reflectivity than said reflective segments (86).

21. An apparatus (34) as set forth in claim 20 further characterized by said magnetic coupling means (64) including at least one driver magnet (66) mounted on said one rotor (46) and at least one corresponding follower magnet (68) mounted on a driven wheel (70) closely spaced from said exterior surface (56) of said housing (54) and supported for rotation upon an axis aligned with said axis (50) of said one rotor (46).

22. An apparatus (34) as set forth in claim 21 further characterized by including a fiber optic conductor (90) for transmitting the light reflected by said disc (62) from said pick-up sensor (82) to a master control unit (40).

23. An apparatus (34) as set forth in claim 22 further characterized by said disc (62) and said driven wheel (70) supported for rotation about a common axis.

* * * * *